May 4, 1965 W. W. JENKINS 3,181,399
ANGULAR CUTTING MACHINE
Filed July 12, 1961 2 Sheets-Sheet 1

INVENTOR.
WALTER W. JENKINS
BY *Woodling, Krost,*
*Granger and Rust,*
ATTORNEYS

May 4, 1965 W. W. JENKINS 3,181,399
ANGULAR CUTTING MACHINE

Filed July 12, 1961 2 Sheets-Sheet 2

INVENTOR.
WALTER W. JENKINS
BY Woodling, Krost,
Granger and Rust,
ATTORNEYS

United States Patent Office 3,181,399
Patented May 4, 1965

3,181,399
ANGULAR CUTTING MACHINE
Walter W. Jenkins, Willowick, Ohio, assignor to The National Acme Company, a corporation of Ohio
Filed July 12, 1961, Ser. No. 123,588
13 Claims. (Cl. 82—11)

The invention relates in general to angular cutting machines and more particularly to a machine capable of machining a face or cut on a rotatable workpiece, which cut is not in a plane normal to the workpiece axis, rather, it is at an acute angle to this normal plane.

In the machining of workpieces having an axis of rotation and a surface of revolution, it has been possible to make a cut on such workpieces which is not parallel to a plane normal to the rotational axis if the workpiece is held stationary and a machining cutter is rotated on an axis normal to the desired cut. For example, if a 5° face is desired on the end of a piece of bar stock, this bar stock may be held stationary and a milling cutter brought into cutting engagement along a 5° axis relative to the bar stock axis. This is the known prior art method of machining such a face at a 5° angle relative to a plane normal to the workpiece axis. However, this requires that the workpiece be stationary and, whereas this method may be satisfactory for some kinds of workpieces, it is not an economical method where many workpieces are to be machined, and particularly where other machining on the rotating workpiece is to be performed. In such case, the workpiece would have to be partially machined while rotating and then stopped for the milling cutter to be brought in to machine the 5° face. Alternatively, the part would have to be removed from the lathe or other machine in which it was chucked and rotated and placed in a second machine in a stationary position for the angular facing cut. In the case of multiple spindle machines operating successively on a plurality of workpieces, it is possible to stop one spindle for such an end facing cut at an angle, but this adds complexity to the multiple spindle machine and also precludes any other machining at that spindle position on a surface of revolution of the workpiece.

Accordingly, it is an object of the present invention to eliminate the disadvantages of the aforesaid prior art method and to machine a cut or a face on a workpiece while it is rotating, yet have this cut at an angle to a normal to the rotating workpiece axis.

Another object of the invention is to provide an angular cutting machine which is simple in construction and operation and which will machine an angular cut while a workpiece is rotating.

Another object of the invention is to provide an angular cutting machine wherein a workpiece is rotated and a tool is oscillated in a single plane in simple harmonic motion in timed relation to that of the workpiece to machine a cut at an acute angle to the workpiece axis.

The invention may be embodied in a machine having a base with a tool holder carried on the base and adapted to hold a tool. An intersecting axis intersects the axis of the workpiece and defines a work machining position thereat. Means is provided to relatively pivot the workpiece and the tool holder about the intersecting axis in a single plane in oscillatory simple harmonic motion, and means is provided to relatively move the workpiece and the tool holder to machine a workpiece at the work machining position at an acute angle relative to a plane normal to the axis of the workpiece.

Other objects and a fuller understanding of this invention may be had by referring to the following description and claims, taken in conjunction with the accompanying drawing, in which:

Figure 2:
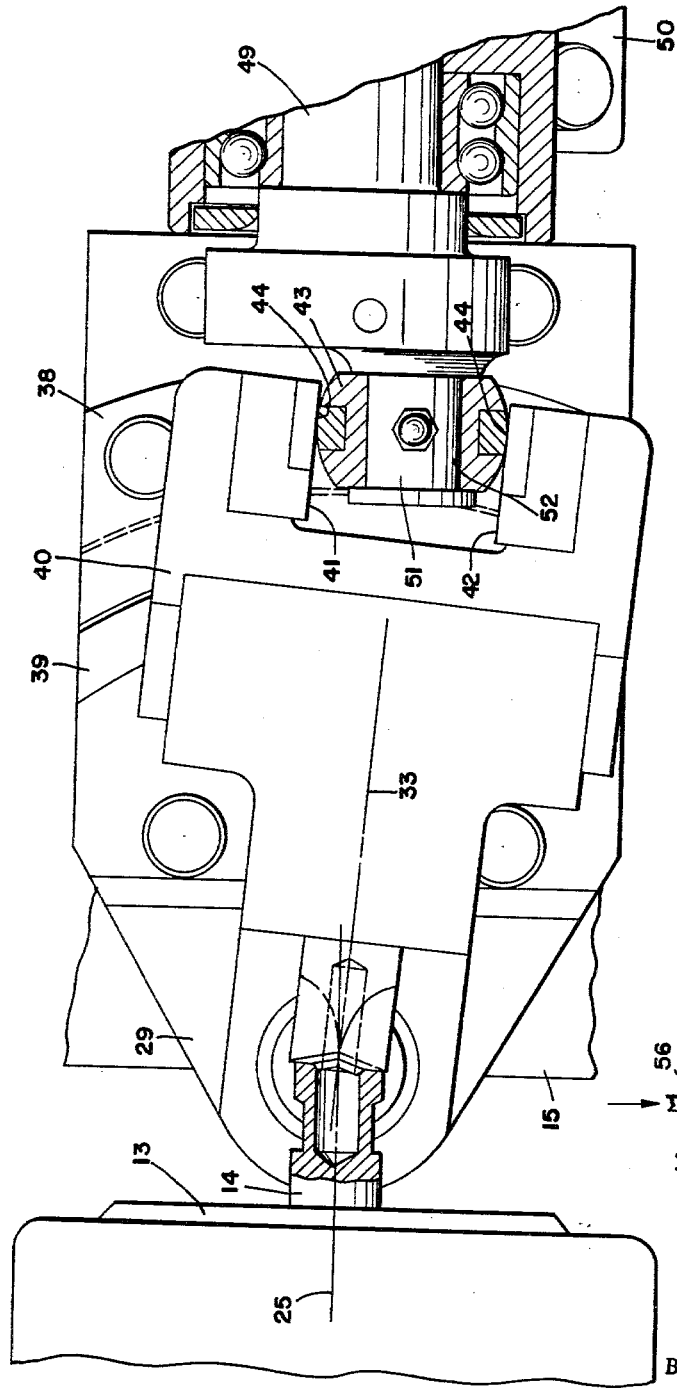
FIGURE 2 is a top plan view of the cutting machine of FIGURE 1.
Figure 3:
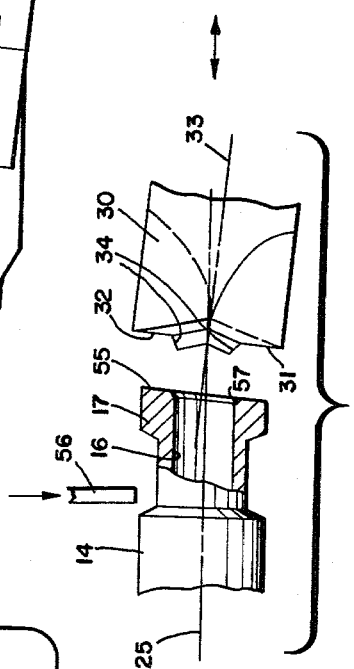
FIGURE 3 is an enlarged partial view similar to part of FIGURE 2 and showing the relationship of the tool and workpiece.

The figures of the drawing show the preferred embodiment of the invention wherein an angular cutting machine 11 is shown as an angular facing attachment for a multiple spindle machine 12. This multiple spindle machine may be one of many types having a number of spindles 13 mounted in a spindle carrier, not shown, and indexable into a plurality of spindle positions, all of which is well known in the machine tool art. This multiple spindle machine may be for bar stock 14, as shown in FIGURE 2, or may be for individual workpieces as in a chucking machine. The multiple spindle machine 12 may have the usual main end tool slide 15 which has a plurality of faces thereon equal in number to the number of spindles and which is positioned on the same axis as the spindle carrier and movable longitudinally therealong. Such main end tool slide 15 on its several faces, may carry tools or attachments for machining the workpieces in the several spindle positions, such as carrying a drill, not shown, to drill an axial hole 16 in the workpiece 17, as shown in FIGURE 3. This axial drilling may be at a spindle position preceding the spindle position shown in the drawing whereat the angle facing cut is made.

Figure 1:
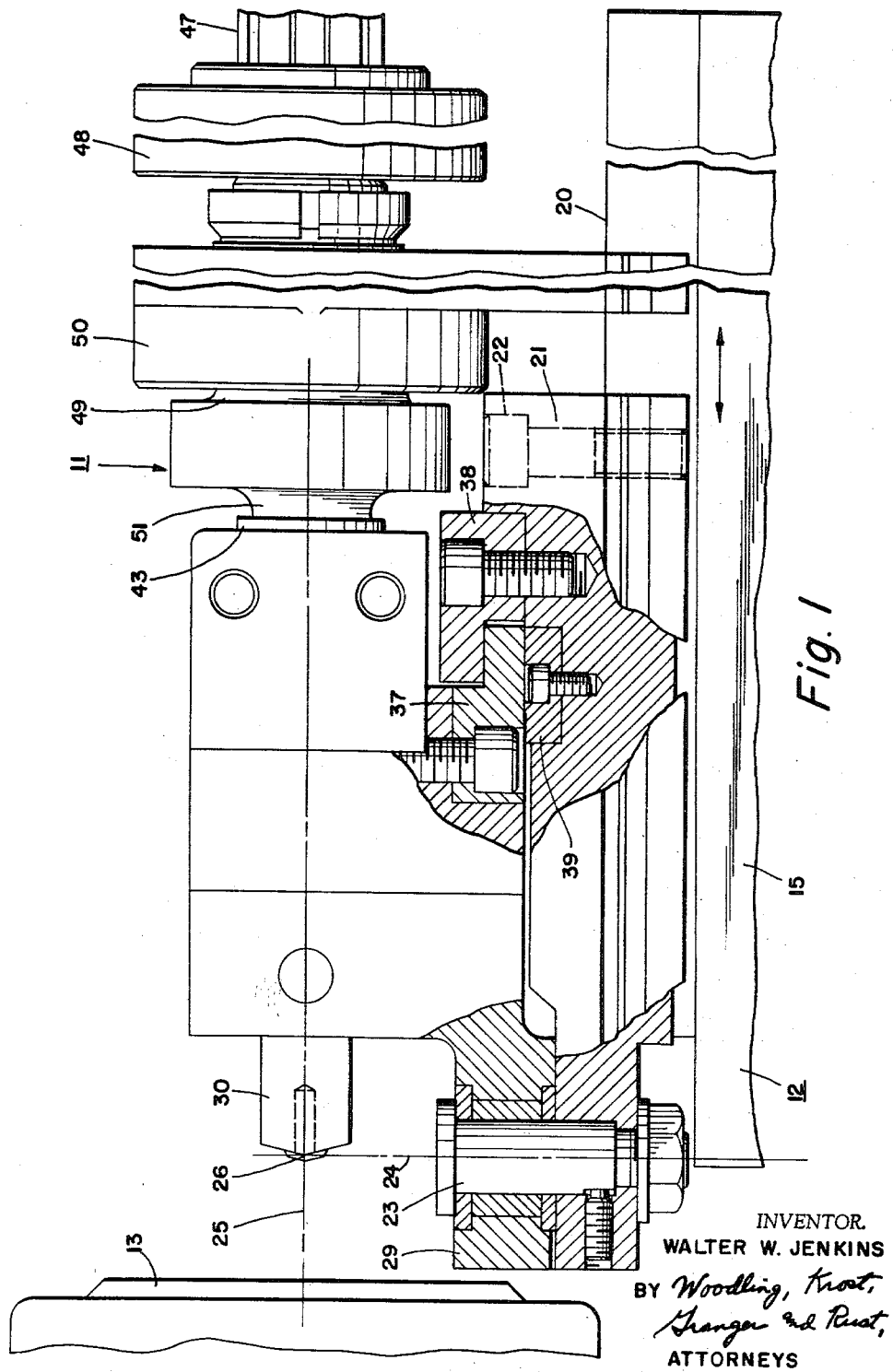
FIGURE 1 is a side elevational view of an angular cutting machine embodying the invention and incorporated in a multiple spindle machine.

The angular cutting machine 11 is shown embodied in an angular facing attachment in this preferred embodiment, but it will be understood that the essence of the invention may be practiced in many other forms of machines. This angular facing attachment 11 is adapted to be mounted on the face 20 of the end tool slide 15. A base 21 is mounted by bolts 22 to this tool slide face 20. The forward end of the base 21 carries a pivot axle 23 having an axis 24 intersecting the axis 25 of the workpiece 17. These two axes 24 and 25 are perpendicular and define a work machining position 26 at such intersection. In FIGURE 1, the bar stock 14 and workpiece 17 on the end thereof are shown removed for clarity, but are shown in FIGURES 2 and 3. A tool holder 29 is pivoted on the pivot axle 23 to be movable in the plane of FIGURE 2. This tool holder is oscillatable through an acute angle and in this example the acute angle is 10° for a facing or cutting operation at a 5° angle relative to a plane normal to the workpiece axis 25. The tool holder 29 carries a facing or cutting tool 30 on the front thereof for operation on the workpiece 17. This tool has a first cutting edge 31 and a second cutting edge 32 extending laterally on opposite sides of a tool axis 33. This tool axis is oscillatory about the pivot axis 24 and in this example, has a maximum oscillatory displacement which is at a 5° angle relative to the workpiece axis 25. The first and second cutting edges face in the opposite direction since they are on opposite sides of the workpiece axis 25, for example, the first cutting edge 31 faces upwardly and the second cutting edge 32 faces downwardly. The tool 30 is also shown as having chamfer sections 34 to chamfer the edge of the bored hole 16.

The tool holder 29 has a partially circular gib 37 fastened to it and mating with a partially circular gib 38 fixed to the base 21. The gib 37 bears against a wear plate 39 fixed to the base 21. These gibs and the wear plate 39 resist forces in a direction parallel to the pivot axle axis 24 and, thus, restrain the tool holder 29 for movement only in the plane of FIGURE 2. A yoke 40 is fixed on the rear of the tool holder 29 and has first and second planar surfaces 41 and 42 which are parallel and parallel to the pivot axis 24. These planar surfaces 41 and 42 are spaced equally on opposite sides of the pivot axis 24 and on opposite sides of the tool axis 33. A slide 43 has opposite cylindrical surfaces 44 in sliding engagement with the planar surfaces 41 and 42. Both the planar surfaces 41 and 42 and the cylindrical surfaces 44 may have hardened inserts therein to resist wear.

The machine tool 12 is capable of driving the workpiece 17 at a given rate of speed and through a drive connection, not shown, also drives a splined drive shaft 47 at the same rate. This drive shaft 47 is connected through a coupling 48 to a crank shaft 49 which is journalled in a housing 50 fixed to the tool slide face 20. A crank 51 is fixed on the forward end of the crank shaft 49 and is journalled at 52 in the slide 43. The end tool slide 15 is longitudinally movable as previously stated by mechanism within the machine tool 12, such as by a main cam drum, for establishing movement of tools and attachments toward and away from workpieces rotated in the spindles 13.

*Operation*

The FIGURE 2 shows the crank 51 at one extreme position of its throw for this top view. This crank 51, the slide 43 and yoke 40 acts as a Scotch yoke to translate rotary motion of the drive shaft 47 into simple harmonic motion of an oscillatory nature. This thus causes the tool holder 29 to oscillate in simple harmonic motion about the pivot axis 24. Accordingly, the tool 30 also has this same simple harmonic motion. Since the workpiece 17 rotates at the same rate of speed and in synchronism with the simple harmonic motion of the tool 30, then 180° rotation of the workpiece 17 will find that the crank 51 has rotated 180° to shift the tool axis 33 to its maximum throw on the opposite side of the workpiece axis 25 relative to the position shown in FIGURE 2. Thus, in the example given, this tool axis 33 oscillates from a position 5° plus and minus relative to the workpiece axis 25. The cutting edges 31 and 32, therefore, machine a face 55 or an angle cut on the workpiece 17, when the end tool slide 15 is brought longitudinally forward, so that the tool 30 is at work machining position 26. At this work machining position, the center of the tool 30 is on the workpiece axis 25 and, accordingly, the angle face 55 is machined on the workpiece 17. FIGURE 3 shows the tool 30 backed off slightly along axis 25 as it would be just after the machining operation is completed and as the end tool slide 15 recedes for clearance between the various tools on the end tool slide 15 and the workpieces in the plural spindles in preparation for indexing of the spindle carrier. A cut-off tool 56 is shown diagrammatically in FIGURE 3 and movable perpendicular to the workpiece axis 25 to cut the finished workpiece 17 off the bar stock 14. The chamfer sections 34 on the tool 30 will also machine a chamfer 57 at the end of the bored hole 16.

The single cutting edge 31, for example, will perform the entire machining operation, however, the second cutting edge 32 is provided to balance the load on the tool 30. This first cutting edge 31 is on one lateral side of the tool axis 33 and it will be noted that this cutting edge 31 in FIGURES 2 and 3 has a maximum throw which is at a 5° angle relative to a normal to the workpiece axis 25. Accordingly, the cutting edge 31 may be considered to be another axis of the tool. In considering the tool axis 33, it will be noted that it moves in simple harmonic motion symmetrically on opposite sides of the workpiece axis 25. In considering the cutting edge 31 as an axis of the tool 30, it will be noted that it moves in simple harmonic motion on opposite sides of a normal to the workpiece axis 25. The oscillation of the tool holder 29 in simple harmonic motion is a means to relatively move the workpiece and the tool holder in a pivotal movement about the axis 24 in a single plane and in oscillatory simple harmonic motion. It is this action which forms the angular cut 55 on the rotating workpiece 17.

The present invention permits machining an angular cut on a rotating workpiece and this is an improvement over the prior art method of making such an angular cut only when the workpiece is stationary. It is possible to construct multiple spindle machines wherein one or more of the spindles may be braked and held stationary at one or more of the spindle positions while other machining is going on at other spindle positions. However, this adds complexity and cost to the multiple spindle machine and also precludes other machining of a surface of revolution on such stationary workpieces. The present invention permits angle facing and angle chamfering as by the tool 30 while the workpiece 17 is rotating, and also permits other machining to be simultaneously performed on the surface of revolution at this spindle position. For example, this could be machining the exterior form of the workpiece 17 or could be operation of the the cut-off tool 56 as the tool 30 recedes from the face 55.

The housing 50 may be shifted forward and backward on the tool slide face 20 to slightly change the angular throw of the tool holder 29. This will permit accurate minor adjustment of the angle of maximum throw and, accordingly, the angle of the cut on the workpiece 17. The coupling 48 permits accurate angular adjustment between the splined shaft 47 and the crank 51. This permits establishing the high point, for example, of the angle face 55 relative to some other reference mark on the circumference of the workpiece 17, for example a keyway. This is because the position of the crank 51 may be adjusted relative to the instantaneous position of the workpiece 17.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An angular cutting machine for a rotatable workpiece comprising in combination, a base, a tool holder carried on said base and adapted to hold a tool, an axis intersecting the axis of the workpiece and defining a work machining position thereat, Scotch yoke and crank means to relatively pivot said workpiece and said toolholder about said intersecting axis in a single plane in oscillatory simple harmonic motion at the rate of rotation of said workpiece or a harmonic thereof, and feed means to relatively move said workpiece and said tool holder whereby said workpiece is machined at said work machining position at an acute angle relative to a plane normal to the axis of said workpiece.

2. An angular cutting machine for a rotatable workpiece comprising, in combination, a base, a tool holder pivoted on said base on an axis intersecting the workpiece axis, said tool holder adapted to hold a tool along a tool axis, means to cause said tool holder to oscillate in a single plane about said pivot axis in simple harmonic motion at the rate of rotation of said workpiece or a harmonic thereof to cause said tool axis to oscillate and feed means to relatively move said workpiece and said tool holder whereby said workpiece is machined at an acute angle relative to a plane normal to the axis of said workpiece.

3. An angular cutting machine for a rotatable workpiece comprising, in combination, a base, a tool holder pivoted on said base on a pivot axis intersecting the axis of rotation of said workpiece at a work machining position, a tool on said tool holder adapted to perform an angular cutting operation on any said workpiece at said work machining position, said tool having a cutting edge laterally on one side of the workpiece axis, a Scotch yoke connected to move said tool holder, a crank acting on said Scotch yoke and rotated at the same rate as said workpiece to cause said tool holder to oscillate about said pivot axis, and feed means to relatively move said workpiece and said tool to engage same whereby said workpiece is machined at an acute angle relative to a plane normal to the axis of said workpiece.

4. An angular cutting machine for a rotatable workpiece comprising in combination, a base, a tool holder pivoted on said base on an axis perpendicular to the axis of rotation of said workpiece at a work machining position, a tool on said tool holder adapted to perform an angular cutting operation on any said workpiece at said work machining position, said tool having a cutting edge laterally on one side of the workpiece axis, a Scotch yoke on said tool holder, a drive shaft journaled relative to said base and rotated at the same rate as said workpiece, a crank on said drive shaft and acting on said Scotch yoke to cause said tool holder to oscillate about said pivot axis upon rotation of said drive shaft and said workpiece, and feed means to relatively move said workpiece and said tool to bring said tool cutting edge into engagement with said workpiece.

5. An angular facing attachment for a rotatable workpiece comprising, in combination, a base, a tool holder pivoted on said base on an axis perpendicular to the axis of rotation of said workpiece at a work machining position, a tool on said tool holder adapted to perform an angular end facing operation on any said workpiece at said work machining position, said tool having a cutting edge laterally on one side of the workpiece axis, a Scotch yoke on said tool holder, a drive shaft journalled relative to said base and rotated at the same rate as said workpiece, a crank shaft on said drive shaft and acting on said Scotch yoke to cause said tool holder to oscillate about said pivot axis upon rotation of said drive shaft and said workpiece, and means to relatively longitudinally move said workpiece and said tool holder to bring said tool cutting edge into engagement with said workpiece.

6. An angular facing attachment for a rotatable workpiece comprising, in combination, a base, a tool holder pivoted on said base on a pivot axis perpendicular to the axis of rotation of any said workpiece at a work machining position, a tool on the front of said tool holder adapted to perform an angular end facing operation on any said workpiece at said work machining position, said tool having a cutting edge laterally on one side of the workpiece axis, a Scotch yoke on said tool holder having planar surfaces parallel to said pivot axis, a slide having cylindrical surfaces in engagement with said Scotch yoke, a drive shaft journalled relative to said base and rotated at the same rate as said workpiece, a crank shaft on said drive shaft and journalled in said cylindrical slide to cause said tool holder to oscillate about said pivot axis upon rotation of said drive shaft and said workpiece, and means to relatively longitudinally move said workpiece and said tool holder to bring said tool cutting edge into engagement with an end face of any said workpiece.

7. An angular cutting attachment for a rotatable workpiece comprising, in combination, a base, a tool holder pivoted on said base on a pivot axis perpendicular to the axis of rotation of said workpiece at a work machining position, a tool on said tool holder adapted to perform a cutting operation on any said workpiece at said work machining position, said tool having a cutting edge laterally on one side of the workpiece axis, a yoke on the rear of said tool holder having planar surfaces parallel to said pivot axis, a slide having cylindrical surfaces in engagement with said planar surfaces of said yoke and slidably movable in said yoke in a direction parallel to said pivot axis, a drive shaft journalled relative to said base and rotated directly at the same rate as said workpiece, a crank shaft fixed on the forward end of said drive shaft and journalled in said cylindrical slide to cause said tool holder to oscillate about said pivot axis upon rotation of said drive shaft and said workpiece, and means to relatively longitudinally move said base and said workpiece to bring said tool cutting edge into engagement with any said workpiece.

8. An angular facing attachment for a multiple spindle machine tool having a longitudinally movable end tool slide and a plurality of work holding rotatable spindles indexable in a spindle carrier, said angular facing attachment comprising, in combination, a base mounted on said end tool slide near one of the spindle positions of said spindles, a pivot axle fixed in said base on an axis perpendicular to the axis of rotation of one of said spindles at a work machining position, a tool holder carried on said base and pivoted on said pivot axle to oscillate through a given angle in the order of 10°, a tool on the front of said tool holder adapted to perform an angular end facing operation on any workpiece in said spindle position at said work machining position, said tool having a cutting edge laterally on one side of the axis of said spindle position, a yoke on the rear of said tool holder having planar surfaces parallel to said pivot axle axis, a slide having cylindrical surfaces in engagement with said planar surfaces of said yoke and slidably movable in said yoke in a direction parallel to said pivot axle axis, a drive shaft journalled relative to said base and rotated directly at the same rate as said spindles, a crank shaft fixed on the forward end of said drive shaft and journalled in said cylindrical slide to cause said slide to oscillate in a direction parallel to said pivot axle axis upon rotation of said drive shaft and said workpiece, and means to move said end tool slide in a longitudinal direction to bring said tool cutting edge into engagement with an end face of any said workpiece whereby said workpiece is machined at an angle half said given angle relative to a plane normal to the axis of said workpiece.

9. An angular facing attachment for a rotatable workpiece comprising, in combination, a base, a pivot axle fixed in said base on an axis perpendicular to the axis of rotation of said workpiece at a work machining position, a tool holder carried on said base and pivoted on said pivot axle to oscillate through an angle in the order of 10°, a tool on the front of said tool holder adapted to perform an angular end facing operation on any said workpiece at said work machining position, said tool having a first cutting edge laterally on one side of the axis of said spindle position and a second cutting edge facing in the opposite direction laterally on the opposite side of said axis, circular gibs on said tool holder and said base retaining said tool holder on said base against forces in the direction of said pivot axle axis, a yoke on the rear of said tool holder having planar surfaces parallel and parallel to said pivot axle axis and spaced equally on opposite sides thereof, a slide having cylindrical surfaces in engagement with said planar surfaces of said yoke and slidably movable in said yoke in a direction parallel to said pivot axle axis, a drive shaft journalled relative to said base and rotated directly at the same rate as said workpiece, a crank shaft fixed on the forward end of said drive shaft and journalled in said cylindrical slide to cause said slide to oscillate in a direction parallel to said pivot axle axis upon rotation of said drive shaft and said workpiece, and means to relatively longitudinally move said base and said workpiece to bring said tool cutting edges into engagement with an end face of any said workpiece whereby said workpiece is machined at an angle in the order of 5° relative to a plane normal to the axis of said workpiece.

10. An angular facing attachment for a multiple spindle machine tool having a longitudinally movable end tool slide and a plurality of work holding rotatable spindles indexable in a spindle carrier, said angular facing attachment comprising, in combination, a base mounted on one face of said end tool slide near one of the spindle positions of said spindles, a housing mounted on the same face of said end tool slide to the rear of said spindle position, a pivot axle fixed in said base on an axis perpendicular to the axis of rotation of one of said spindles at a work machining position, a tool holder carried on said base and pivoted on said pivot axle to oscillate through an angle in the order of 10°, a tool on the front of said tool holder adapted to perform an angular end facing operation on any workpiece in said spindle position at said work machining position, said tool having a first cutting edge laterally on one side of the axis of said spindle position and a second cutting edge facing in the opposite direction laterally on the opposite side of said axis, circular gibs on said tool holder and said base retaining said tool holder on said base against forces in the direction of said pivot axle axis, a yoke on the rear of said tool holder having planar surfaces parallel and parallel to said pivot axle axis and spaced equally on opposite sides thereof, a slide having cylindrical surfaces in engagement with said planar surfaces of said yoke and slidably movable in said yoke in a direction parallel to said pivot axle axis, a splined drive shaft journalled in said housing parallel to the spindle axes and rotated directly at the same rate as said spindles, a crank shaft fixed on the forward end of said drive shaft and journalled in said cylindrical slide to cause said slide to oscillate in a direction parallel to said pivot axle axis upon rotation of said drive shaft and said workpiece, and means to move said end tool slide in a longitudinal direction to bring said tool cutting edges into engagement with an end face of any said workpiece whereby said workpiece is machined at an angle in the order of 5° relative to a plane normal to the axis of said workpiece.

11. An angular cutting machine for a rotatable workpiece comprising, in combination, a base, a tool holder carried on said base and adapted to hold a tool, an axis intersecting the workpiece and defining a work machining position thereat, means to relatively pivot said workpiece and said tool holder about said intersecting axis in a single plane in oscillatory simple harmonic motion at the rate of rotation of said workpiece or a harmonic thereof, and feed means to relatively move said workpiece and said tool holder whereby said workpiece is machined at said work machining position to have a surface of revolution with an axis different from the axis of said workpiece.

12. An angular cutting machine for a rotatable workpiece comprising, in combination, a base, a tool holder pivoted on said base on an axis intersecting the workpiece, means to cause said tool holder to oscillate in a single plane about said pivot axis in simple harmonic motion at the rate of rotation of said workpiece or a harmonic thereof, and feed means to relatively move said workpiece and said tool holder toward each other.

13. An angular cutting machine for a rotatable workpiece comprising, in combination, a base, a tool holder pivoted on said base on a pivot axis in a plane normal to the axis of rotation of said workpiece, a tool on said tool holder, a Scotch yoke connected to said tool holder, a crank acting on said Scotch yoke and rotated at the same rate as said workpiece to cause said tool holder to oscillate about said pivot axis, and feed means to relatively move said workpiece and said tool toward each other.

References Cited by the Examiner
UNITED STATES PATENTS

| | | | |
|---|---|---|---|
| 2,374,477 | 4/45 | Feaster | 83—12 |
| 2,919,615 | 1/60 | Brown | 82—11 |

WILLIAM W. DYER, JR., *Primary Examiner.*

RICHARD H. EANES, JR., *Examiner.*